US008808018B2

(12) United States Patent
Gaumer et al.

(10) Patent No.: US 8,808,018 B2
(45) Date of Patent: Aug. 19, 2014

(54) DEVICE FOR COUPLING AN ASYNCHRONOUS MOTOR WITH AN ELECTRICAL POWER CABLE

(75) Inventors: Thierry Gaumer, Souligne Sous Ballon (FR); Martin Ragaine, Change (FR)

(73) Assignee: Souriau, Versailles (FR)

( * ) Notice: Subject to any disclaimer, the term of this patent is extended or adjusted under 35 U.S.C. 154(b) by 510 days.

(21) Appl. No.: 13/097,811

(22) Filed: Apr. 29, 2011

(65) Prior Publication Data
US 2011/0266900 A1 Nov. 3, 2011

(30) Foreign Application Priority Data

Apr. 30, 2010 (FR) ..................................... 10 53351

(51) Int. Cl.
*H01R 4/38* (2006.01)
(52) U.S. Cl.
USPC .......................................... 439/255; 439/512
(58) Field of Classification Search
USPC ........... 439/20, 188, 510, 511, 512, 514, 221, 439/225; 310/71
See application file for complete search history.

(56) References Cited

U.S. PATENT DOCUMENTS

| | | | | |
|---|---|---|---|---|
| 2,922,054 A | * | 1/1960 | Miller | 310/71 |
| 3,597,716 A | * | 8/1971 | Stuart et al. | 439/510 |
| 3,602,748 A | | 8/1971 | Locke | |
| 4,272,714 A | * | 6/1981 | Vind | 318/783 |
| 4,339,638 A | * | 7/1982 | Lascelles et al. | 200/52 R |
| 4,547,689 A | | 10/1985 | Tsuchimoto et al. | |
| 5,290,191 A | * | 3/1994 | Foreman et al. | 439/225 |
| 6,139,345 A | * | 10/2000 | Muzslay | 439/225 |
| 2009/0251015 A1 | | 10/2009 | Michel et al. | |
| 2012/0126647 A1 | * | 5/2012 | Quero et al. | 310/71 |
| 2012/0322298 A1 | * | 12/2012 | Aime et al. | 439/510 |

FOREIGN PATENT DOCUMENTS

FR   536 390 A   5/1922

OTHER PUBLICATIONS

French Search Report, dated Jan. 11, 2011, from corresponding French application.

* cited by examiner

*Primary Examiner* — Hae Moon Hyeon
(74) *Attorney, Agent, or Firm* — Young & Thompson

(57) ABSTRACT

A device for coupling an asynchronous motor with an electrical power supply cable includes a socket (100) designed to be connected to the asynchronous motor so that each of the six wires (17, 18, 19, 20, 21, 22) of the asynchronous motor corresponds to a contact (103) of the three-phase socket, a plug (100) designed to be connected to the electrical power supply cable so that each of the three wires of the electrical power supply cable corresponds to one contact of the plug, and at least one shunt (110) including at least two connection strips (111, 112) each designed to couple two contacts of the three-phase socket. An asynchronous motor provided with a connection device such as this and a method for coupling an asynchronous motor are also described.

16 Claims, 3 Drawing Sheets

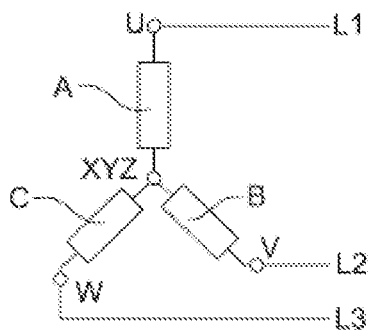
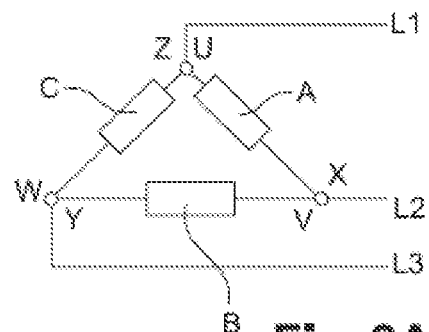
Fig. 1A (Prior Art)  Fig. 2A (Prior Art)
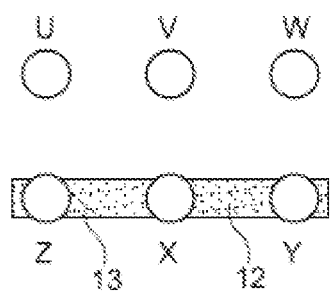
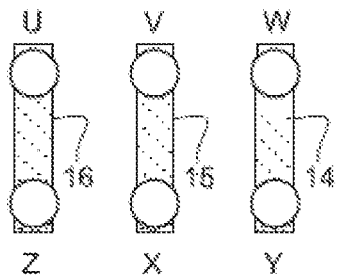
Fig. 1B (Prior Art)  Fig. 2B (Prior Art)
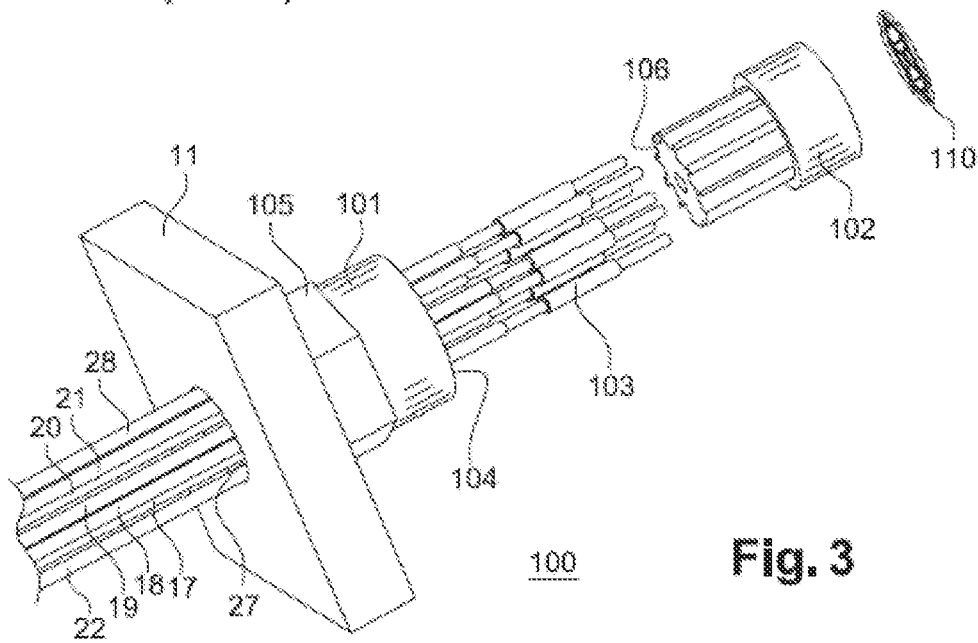
Fig. 3

DEVICE FOR COUPLING AN ASYNCHRONOUS MOTOR WITH AN ELECTRICAL POWER CABLE

BACKGROUND OF THE INVENTION

1. Field of the Invention

The invention pertains to a device for coupling an asynchronous motor with an electrical power cable. More specifically, the invention pertains to a coupling device for making an asynchronous motor work in a star connection or delta connection depending on a user's needs. The invention also pertains to an asynchronous motor of this kind provided with a coupling device of this kind. Similarly, the invention pertains to a method for coupling an asynchronous motor with an electrical power cable using a coupling device of this kind.

An asynchronous motor is an alternating current electrical machine comprising a stator, linked to a speed variator, and a rotor crossed by currents induced by the magnetic field created by the stator currents. An asynchronous motor is generally connected to a three-phase network. A three-phase asynchronous motor of this kind can be driven in a star coupling configuration or in a delta coupling configuration. Depending on the use, or final purpose, of the asynchronous motor, it may be worthwhile to have a three-phase asynchronous motor in a star coupling or a three-phase asynchronous motor in a delta coupling.

As can be seen in FIGS. 1A and 1B, the three coils A, B and C of the rotor of an asynchronous motor are each connected to two wires of the electrical output of the asynchronous motor, which have six of them in all. Furthermore, each coil is connected to one of the three wires L1, L2 and L3 of the power supply cable. The coils A, B, C can thus be mounted in two ways, either in a star configuration (FIG. 1A) or in a delta configuration (FIG. 1B).

The choice of the wiring of the asynchronous motor is generally done when it is being mounted in the final device that must receive it, and as a function of the characteristics sought. For example, when it is desired to reduce the intensity of the motor at start-up, there are known ways of using a star-coupled three-phase asynchronous motor (FIG. 1A). Conversely, when it is desired to exploit the maximum power torque of the asynchronous motor, there are known ways of using a delta coupling (FIG. 1B).

The star coupling of FIG. 1A is generally obtained by having two connection strips 12, 13 as shown in FIG. 1B. These connection strips 12 and 13 put the terminals X, Y and Z at the same neutral potential. The terminals U, V and W can then be wired with the three conductors L1, L2 and L3.

Conversely, as can be seen in FIGS. 2A and 2B, the delta coupling is obtained by using three connection strips 14, 15 and 16 each connected independently of the others to two terminals, respectively Z and U, V and X, W and Y in FIG. 2B. The three conductors L1, L2 and L3 of the power supply cable are then each connected to a connection strip 14, 15 and 16.

A choice of the operating mode such as this is generally done at the outset and generally not modified thereafter.

2. Description of the Related Art

FIG. 7 shows an example of a prior-art asynchronous motor 1 provided with an open terminal box or junction box 2. In the internal volume 5 of the junction box 2 are housed the six terminals U, V, W, X, Y, Z, or coils of the rotor. The three wires of the power supply cable 4 open out into the junction box 2 through a via hole 3 made on the wall of the junction box 2. Each wire (not shown) of the power cable 4 is wired individually to a terminal U, V, W, X, Y, Z of the rotor. Two connection strips 12, 13 enable a star-shaped coupling as shown in FIG. 1B, each strip 12, 13 being fixed individually between two terminals X and Z, and X and Y respectively.

Thus, when an installer wishes to install an asynchronous motor 1 of this kind with a given mode of operation, he must bring the power cable 4 through the hole 3 so that the three wires of the power cable 4 open out into the internal volume 5 of the junction box 2. He then fixes the connection strips 12, 13 between the terminals X, Y and Z to obtain the star-shaped wiring. The installer must then individually connect the three wires of the power cable 4 to the remaining terminals U, V and W. Then he puts back the lid (not shown) on the junction box 2 and fixes it by means of four screws. Thus, the connection, the choice of the mode of operation and the implementation of the corresponding coupling are painstaking operations since it is necessary to work terminal by terminal and wire by wire, and moreover, the installer has to open up and then re-shut the junction box 2.

BRIEF SUMMARY OF THE INVENTION

The invention seeks to provide an alternative to the prior-art connection devices that enables swift and easy assembly of an asynchronous motor with a power cable whatever the coupling chosen, whether a star coupling or a delta coupling.

To this end, the invention proposes the use of a socket that can be configured for a three-phase power supply receiving the six wires of the coil of the asynchronous motor, as well as an additional plug receiving the three wires of the electrical power supply cable to which the asynchronous motor must be connected. A shunt is brought to the connection interface between the plug and the socket in order to couple the contacts of the socket with the contacts of the plug in a star or delta configuration as needed. The shunt may be for example a metal piece provided with at least six via holes through each of which there passes a contact of the socket. The shunt may thus be fixed to but detachable from the connection face of the socket, facilitating handling operations by the user when he wishes to do the wiring. The shunt also has at least two connection strips designed to place terminals of the socket at the same potential two by two, depending on the chosen mode of wiring. The invention advantageously proposes a connection kit comprising the three-phase socket designed to be fixedly joined to the asynchronous motor, a plug designed to be connected to the electrical power supply cable and two shunts respectively provided with two and three connection strips in order to enable the final user to set up a wiring in a star configuration or a delta configuration. The wiring device of the invention simplifies the wiring method as such by eliminating especially the wiring steps performed terminal by terminal. A simple plug/socket connection makes it possible, by interposing the shunt needed at the connection interface, to obtain the desired delta or star coupling.

The invention therefore pertains to a device for coupling an asynchronous motor with an electrical power supply cable characterized in that it comprises:

a socket equipped with six electrical contacts, designed to be connected to the asynchronous motor so that each of the six wires of the asynchronous motor corresponds to a contact of the socket, a plug designed to be connected to the electrical power supply cable so that each of the three wires of the electrical power supply cable corresponds to one contact of the plug, and at least one shunt comprising at least two connection strips each designed to couple the contacts of the socket two by two.

According to exemplary embodiments of the coupling device of the invention, it is possible to provide for all or part of the following complementary characteristics:

the shunt has two connection strips, laid out so that they can series-connect three contacts of the socket in order to obtain a star coupling of the asynchronous motor.

the shunt has three connection strips, laid out so that each can couple two contacts of the socket, in order to obtain a delta coupling of the asynchronous motor.

the socket and the plug each have a ground.

The invention also pertains to an asynchronous motor provided with a coupling device of this kind. The socket is advantageously fixedly joined to the housing of the motor in order to be easily accessible to the user. It is no longer necessary to use a junction box. This reduces the general space requirement of the asynchronous motor.

Furthermore, the invention pertains to a method for coupling an asynchronous motor to an electrical power supply cable by means of a coupling device of this kind, comprising the following steps:

each of the six wires of the asynchronous motor is electrically connected to a contact of the socket, each of the three wires of the power supply cable is electrically connected to a contact of the plug, the mode of operation of the asynchronous motor is chosen so as to couple the contacts of the socket accordingly two by two, using a shunt provided with the corresponding connection strips, the plug is connected to the socket.

Depending on the examples of implementation of the method according to the invention, it is possible to provide for all or part of the following additional steps:

the socket is fixedly joined to the housing of the asynchronous motor;

the plug is disconnected from the socket so as to change the shunt to modify the number and position of the connection strips at the interface between the plug and the socket and pass from a delta coupling to a star coupling or vice versa in order to change the mode of operation of the asynchronous motor, and then the plug is reconnected to the socket.

BRIEF DESCRIPTION OF THE DRAWINGS

The invention will be understood more clearly from the following description and from the accompanying figures. These figures are given by way of an indication and in no way restrict the scope of the invention. Of these figures:

FIGS. 1A and 1B are respectively an electrical diagram (FIG. 1A) of a wiring in a star configuration and a view in section (FIG. 1B) of an asynchronous motor box corresponding to the prior art;

FIGS. 2A and 2B are respectively an electrical diagram (FIG. 2A) of a wiring in a delta configuration and a view in section (FIG. 2B) of an asynchronous motor box corresponding to the prior art;

FIG. 3 is a general exploded view of a socket of a coupling device for an asynchronous motor according to the invention;

DETAILED DESCRIPTION OF THE PREFERRED EMBODIMENTS

Figure 4:
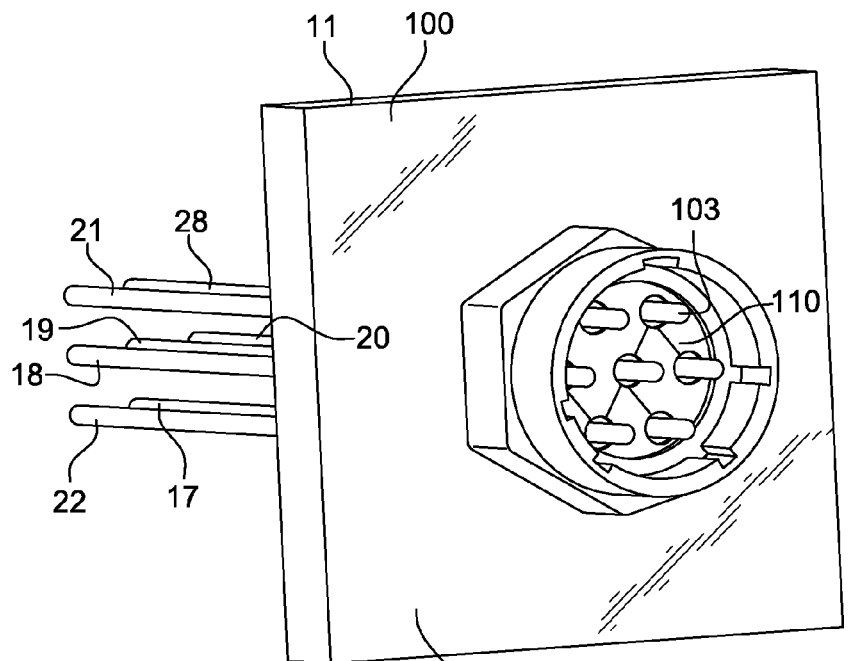
FIG. 4 is a front view of the socket of FIG. 3 mounted on a housing of the asynchronous motor.

FIGS. 3 and 4 show an example of a socket 100 designed, according to the invention, to be attached to the housing 11 or external wall of an asynchronous motor. In particular, a socket of this kind may be fixed to the external wall of the asynchronous motor of FIG. 7 instead of the junction box 2.

The socket 100 has a main hollow cylindrical-circular body 101 in which there is mounted an insulator 102 that is also cylindrical-circular. The insulator 102 has seven longitudinal channels 106 in each of which there extends a contact 103 of the socket 100.

Figure 5:
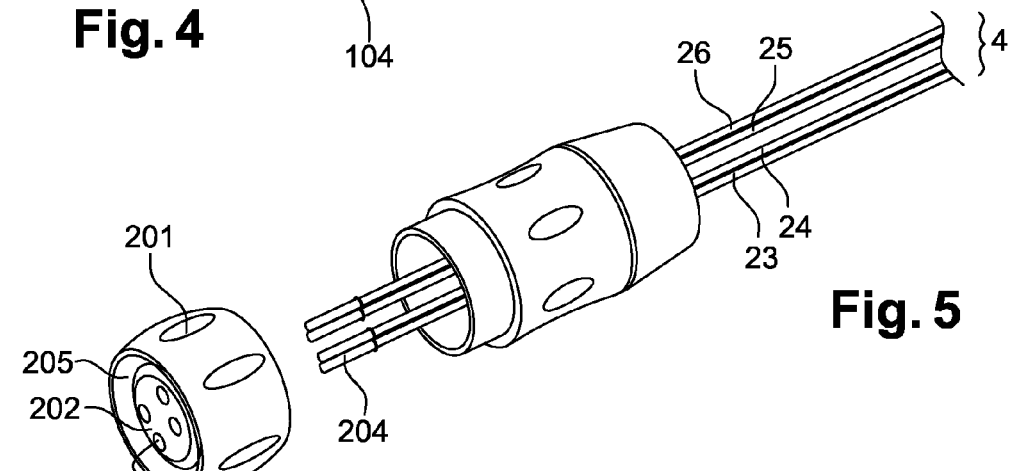
FIG. 5 is a general exploded view of a plug of a coupling device for an asynchronous motor according to the invention.

One connection end 104 of the socket 100 leads to the exterior relatively to the external wall 11 of the asynchronous motor 1 to which it is fixed. The opposite end 105 for its part leads into a via hole 27 made on the external wall 11 of the asynchronous motor 1. The power supply wires 17 to 22 and a ground 28 of the asynchronous motor 1 go through the via hole 27 of the external wall 11 of the asynchronous motor so as to lead into the main body 101 of the socket 100. Each of the power supply wires 17 to 22 and the ground 28 are connected to a contact 103 of the socket 100. Thus, as can be seen in FIG. 4, each of the power supply wires 17 to 22 and the ground 28 of the asynchronous motor coincide with a contact 103 opening out at the connection end 104 of the socket 100 so that it can be connected to a complementary plug 200 as shown in FIG. 5.

The plug 200 has a main hollow cylindrical-circular body 201 in which there is housed an insulator 202 that is also cylindrical-circular. The insulator 202 has four longitudinal channels 203 each designed to receive a core 204 of a contact. Each of the cores 204 of the contacts receives a wire 23, 24, 25 or ground 26 of the power supply cable 4. In a fairly convenient way, the wires 23 to 25 and the ground 26 of the power supply cable 4 are mounted in the cores 204 of the contacts before the insertion of the cores 204 in the channels 203 of the insulator 202.

Each core 204 of the plug 200 is designed to be connected to a complementary contact 103 or pin of the socket 100 in order to supply current to the asynchronous motor 1.

In order to obtain a star coupling or a delta coupling, the device of the invention furthermore comprises a shunt 110 designed to be positioned between the connection face 104 of the socket 100 and the connection face 205 of the plug 200.

The shunt 110 is for example a metal part cut out so as to get positioned between the contacts 103 of the socket 100.

More specifically, said metal part forming the shunt 110 has as many holes are there are contacts 103 on the socket 100. Each contact 103 goes through a hole of the shunt so that said contacts 103 project out of the metal part forming the shunt 110. The cut-out metal part forming the shunt 110 also has connection strips, the number and position of which can vary from one shunt 110 to another depending on the wiring desired.

For example, as shown in FIG. 4, the shunt is formed by a circular flat metal plate provided with seven holes. Each hole lets through a contact 103. On the connection face or front face, corresponding to the face of the shunt pointed towards the plug 200, the drawing shows traced lines representing the possible layout of the connection strips to enable a star coupling or a delta coupling.

Figures 6A, 6B:
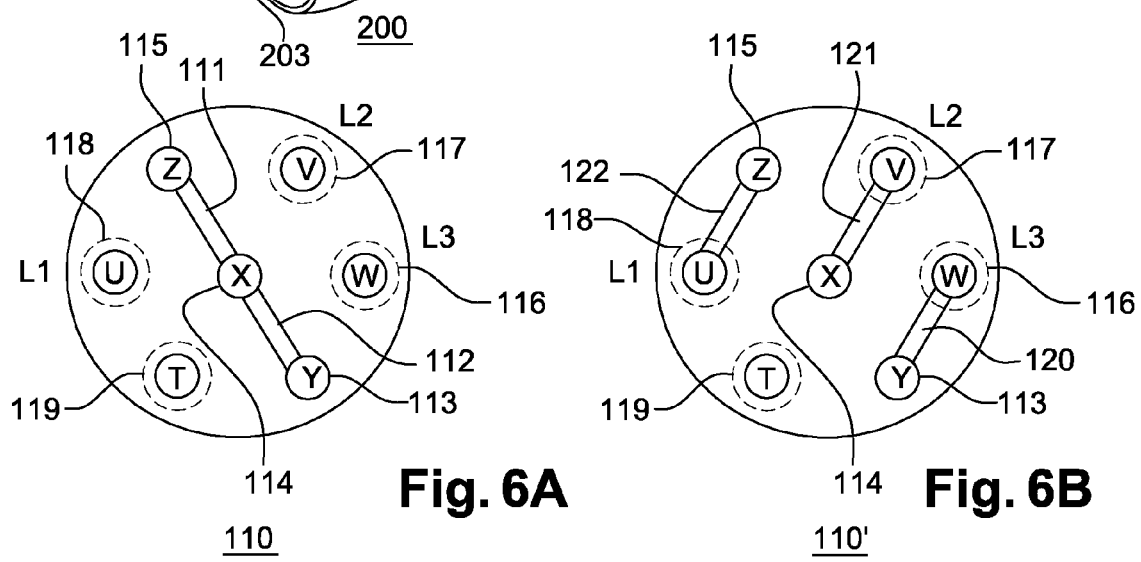
FIGS. 6A and 6B are schematic front views of a shunt enabling a star coupling (FIG. 6A) and a shunt enabling a delta coupling (FIG. 6B)

It is advantageously to the rear face (as shown in FIGS. 6A and 6B) that the connection strips are attached, enabling the star coupling or delta coupling proper.

Thus, the shunt 110 shown schematically in FIG. 6A is designed to enable a star connection. To this end, the shunt 110 has two connection strips 111 and 112 mounted in the extension of one another so as to put the three contacts 103 of the socket at the same potential. More specifically, the connection strips 111, 112 electrically connect three holes 113, 114 and 115 of the metal part forming the shunt 110 and designed to receive the contacts 103 corresponding respectively to the terminals X, Y and Z of the asynchronous motor 1. The holes 116, 117 and 118, designed to receive the contacts 103 corresponding respectively to the terminals U, V and W of the asynchronous motor 1 and the hole 119 designed to receive the ground T of the asynchronous motor 1 are not set at the same potential.

The shunt 110' shown schematically in FIG. 6B for its part is designed to enable a delta connection. The metal part, in addition to the via holes 113 to 119 designed to receive the contacts 103 respectively corresponding to the terminals U, V, W, X, Y, Z and the ground connection T, comprises three connection strips 120, 121 and 122. Each connection strip 120, 121, 122 connects the holes two in sets of two, respectively 113 and 116, 114 and 117, and 115 and 118, the ground connection T being unconnected. Thus, the terminals U and Z, X and V and Y and W of each of the pairs are set at the same potential.

According to the invention, it is enough to interpose a shunt 110 or 110' at the connection interface between the socket 100 and the plug 200 in order to obtain the coupling desired for the asynchronous motor 1. Thereafter, the simple connection of the plug to the socket 100 is enough to obtain the power supply to the asynchronous motor 1. It is no longer necessary to couple the wires terminal by terminal to the asynchronous motor or carry out numerous manipulations.

Figure 7:
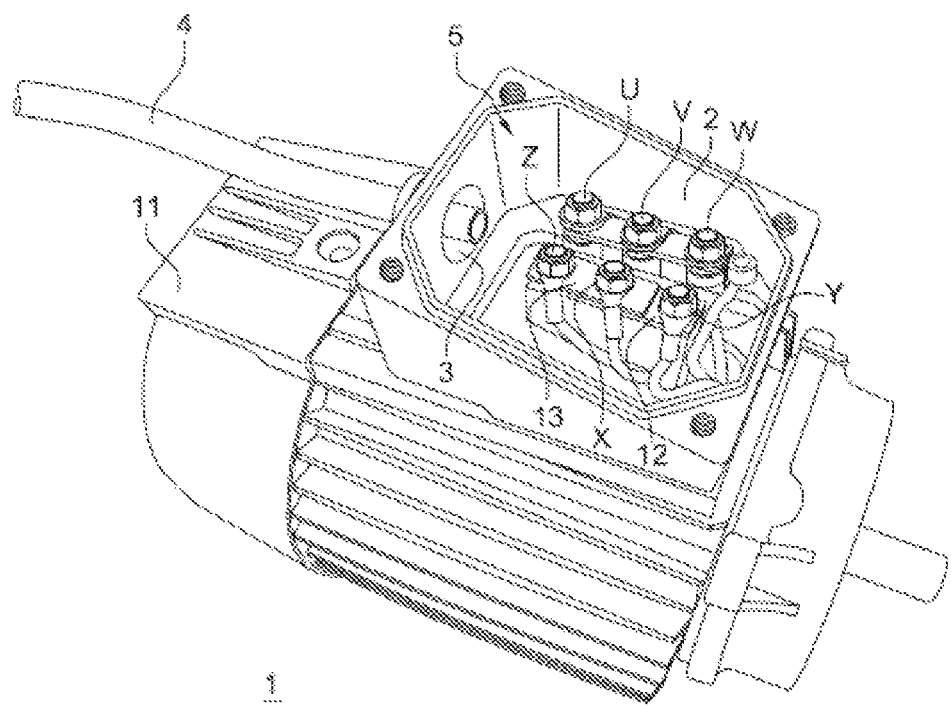
FIG. 7 is a schematic view of an asynchronous motor provided with an already described junction box of the prior art.

Thus, the supplier of the asynchronous motor 1 mounts the socket 100 of the coupling device according to the invention on the h using external wall 11 of the asynchronous motor 1 and especially on an asynchronous motor as shown in FIG. 7, without the junction box 2 of the prior art. The final installer then uses the power cable 4 on which are mounted the plug 200 and the shunt 110, 110' of the coupling device according to the invention. Otherwise, the shunt 110, 110' can be mounted on the socket 100 by the supplier of the asynchronous motor 1.

Since, in order to disconnect the assembly, it is enough to withdraw the plug 200, the user can thereafter easily modify the mode of operation of the asynchronous motor 1 by withdrawing the initially used shunt 110, 110' in order to replace it by another shunt 110, 110' provided with connection strips of a different number and position.

The invention claimed is:

1. A device for coupling an asynchronous motor with an electrical power supply cable, the device comprising:
    a socket comprising six electrical contacts designed to be connected to the asynchronous motor so that each of six wires of the asynchronous motor corresponds to one of the contacts of the socket;
    a plug designed to be connected to the electrical power supply cable so that each of three wires of the electrical power supply cable corresponds to one contact of the plug; and
    at least one shunt comprising at least two connection strips each designed to couple two contacts of the socket.

2. The device for coupling the asynchronous motor to the electrical power supply cable according to claim 1, wherein one of the at least one shunt has two connection strips laid out so that the connection strips can series-connect three contacts of the socket in order to obtain a star coupling of the asynchronous motor.

3. The device for coupling the asynchronous motor to the electrical power supply cable according to claim 1, wherein one of the at least one shunt has three connection strips laid out so that each can couple two contacts of the socket, in order to obtain a delta coupling of the asynchronous motor.

4. The device for coupling the asynchronous motor to the electrical power supply cable according to claim 1, wherein the socket and the plug each have a ground.

5. The asynchronous motor provided with the coupling device according to claim 1.

6. The asynchronous motor according to claim 5, wherein the socket is fixedly joined to the housing of the motor.

7. A method for coupling the asynchronous motor to the electrical power supply cable by the coupling device according to claim 1, comprising the following steps:
    electrically connecting each of the six wires of the asynchronous motor one of the contacts of the socket;
    electrically connecting each of the three wires of the power supply cable to the contact of the plug;
    selectively a mode of operation of the asynchronous motor so as to couple the contacts of the socket accordingly in sets of two by one of the at least one shunt provided with the connection strips; and
    connecting the plug to the socket.

8. The method for coupling the asynchronous motor to the electrical power supply cable according to claim 7, further comprising:
    fixedly joining the socket to a housing of the asynchronous motor.

9. The method for coupling the asynchronous motor to the electrical power supply cable according to claim 7, further comprising:
    disconnecting the plug is disconnected from the socket;
    modifying the number and the position of the connection strips at the interface between the plug and the socket and passing from a delta coupling to a star coupling or vice versa by changing the at least one shunt in order to change the mode of operation of the asynchronous motor; and
    reconnecting the plug to the socket.

10. The method for coupling the asynchronous motor to the electrical power supply cable according to claim 8, further comprising:
    disconnecting the plug from the socket;
    modifying the number and the position of the connection strips at the interface between the plug and the socket and passing from a delta coupling to a star coupling or vice versa by changing the at least one shunt in order to change the mode of operation of the asynchronous motor; and
    reconnecting the plug to the socket.

11. The device for coupling an asynchronous motor to an electrical power supply cable according to claim 2, wherein one of the at least one shunt has three connection strips laid out so that each can couple two contacts of the socket, in order to obtain a delta coupling of the asynchronous motor.

12. The device for coupling the asynchronous motor to the electrical power supply cable according to claim 2, wherein the socket and the plug each have a ground.

13. The device for coupling the asynchronous motor to the electrical power supply cable according to claim 3, wherein the socket and the plug each have a ground.

14. The asynchronous motor provided with the coupling device according to claim 2.

15. The asynchronous motor provided with the coupling device according to claim 3.

16. The device for coupling the asynchronous motor to the electrical power supply cable according to claim 4, wherein one of the at least one shunt has three connection strips laid out so that each can couple two contacts of the socket, in order to obtain a delta coupling of the asynchronous motor.

* * * * *